(12) United States Patent
Groome

(10) Patent No.: US 6,567,669 B1
(45) Date of Patent: May 20, 2003

(54) LOCATION ESTIMATION OF ONE OR MORE TRANSMITTERS BASED ON SIGNALS TRANSMITTED THEREFROM

(75) Inventor: W. C. Andrew Groome, Satellite Beach, FL (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/571,237

(22) Filed: May 16, 2000

Related U.S. Application Data
(60) Provisional application No. 60/191,269, filed on Mar. 22, 2000.

(51) Int. Cl.[7] ................................................ H04M 7/20
(52) U.S. Cl. ........................................ 455/456; 342/465
(58) Field of Search ............................. 455/450, 451, 455/452, 62, 456; 342/450, 452, 463, 465

(56) References Cited

U.S. PATENT DOCUMENTS 5,394,158 A * 2/1995 Chia ........................... 342/457
5,883,598 A * 3/1999 Parl et al. .................... 342/457
6,122,512 A * 9/2000 Bodin .......................... 455/440

* cited by examiner

Primary Examiner—Vivian Chin
Assistant Examiner—Tu X Nguyen

(57) ABSTRACT

A method is disclosed for estimating the location of a transmitter based on signals transmitted therefrom. The transmitted signals are received at a plurality of reception locations and are employed to compile data including a plurality of entries, where each entry includes a received signal level (RSL) of a received signal, a channel identification of the received signal, and position information corresponding to the respective reception location when the received signal was received. The entries are organized into groups according to channel identification, and, in each group, entries having the same position information are consolidated. Thereafter, for each entry, the distance DRT between the reception location and the transmitter is estimated, and the distance DRR between the reception location thereof and an adjacent reception location is also estimated. Then, for each group, the location of the transmitter corresponding to the channel identification of such group is estimated based on the distances DRT and DRR.

30 Claims, 3 Drawing Sheets

LOCATION ESTIMATION OF ONE OR MORE TRANSMITTERS BASED ON SIGNALS TRANSMITTED THEREFROM

CROSS-REFERENCE TO RELATED APPLICATION

This application claims the benefit of U.S. Provisional Application No. 60/191,269, filed Mar. 22, 2000 and entitled "Location Estimation of One or More Transmitters Based On Signals Transmitted Therefrom", hereby incorporated by reference.

FIELD OF THE INVENTION

The present invention relates to a system and method that estimates the location of a single or multiple transmitters. More particularly, the present invention relates to such an estimation method that uses measured data such as Received Signal Strength Indication (RSSI) data collected by a scanning and tracking receiver such as that which may be commercially available.

BACKGROUND OF THE INVENTION

The non-invasive estimation of transmitter location and configuration based on signals received from such transmitter(s) is considered to be highly useful in many circumstances. For example, an investment banker or the like may employ such information for preliminary asset determination among other things; a tower company or the like may employ such information for development of a business plan and guidance for site acquisition personnel among other things; a competitor wireless service provider or the like may employ such information to assess the overall system layout of other service providers in a particular market among other things; and a consultant or the like may employ such information to provide value added services to improve overall system performance to a client among other things.

One typical methodology that may be employed to non-invasively estimate the location of a particular transmitter is to measure signal strengths of signals received from such transmitter at several reception locations, to estimate distance based on such measured signal strengths, and then to triangulate based on such estimated distances. However, and importantly, many factors affect signal strength as measured at a particular reception location, including but not limited to transmission power, terrain, atmospheric conditions, interference, line of sight issues, etc. Thus, the distances estimated from such measured signal strengths have relatively large margins of error, and accordingly triangulation calculations based on such estimated distances have relatively large margins of error, too. Ultimately, the margin of error of such triangulation calculations is so significant as to render the result of the calculations highly suspect if not meaningless.

Accordingly, a need exists for a system and methodology for non-invasively estimating transmitter location and configuration information, whereby the margin of error of the result of the methodology is within a more acceptable range.

SUMMARY OF THE INVENTION

The present invention satisfies the aforementioned need by providing a method for estimating the location of a transmitter based on signals transmitted therefrom. The transmitted signals are received at a plurality of reception locations and are employed to compile data including a plurality of entries, where each entry includes a received signal level (RSL) of a received signal, a channel identification of the received signal, and position information corresponding to the respective reception location when the received signal was received.

In the method, the entries are organized into groups according to channel identification, and, in each group, entries having the same position information are consolidated. Thereafter, for each entry, the distance DRT between the reception location and the transmitter is estimated, and the distance DRR between the reception location thereof and an adjacent reception location is also estimated. Then, for each group, the location of the transmitter corresponding to the channel identification of such group is estimated based on the distances DRT and DRR.

BRIEF DESCRIPTION OF THE DRAWINGS

The foregoing summary as well as the following detailed description of the present invention will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
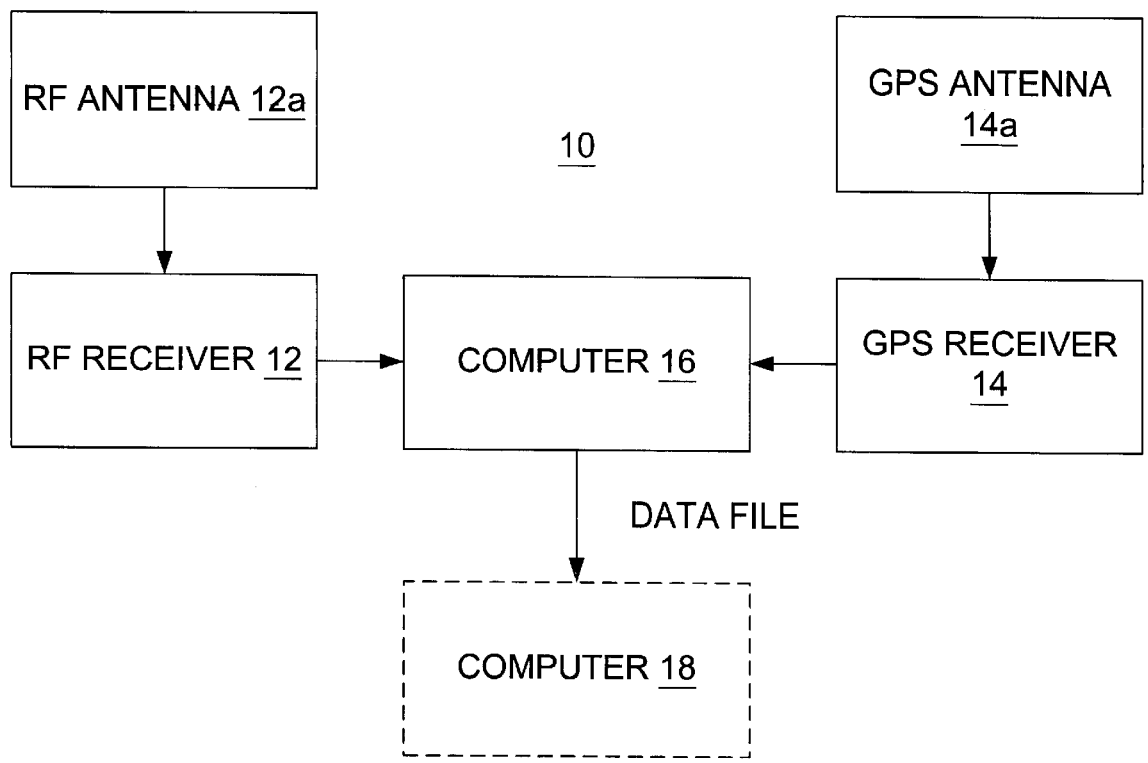
FIG. 1 is a data collection system employed in accordance with one embodiment of the present invention.

Certain terminology may be used in the following description for convenience only and is not considered to be limiting. For example, the words "left", "right", "upper", and "lower" designate directions in the drawings to which reference is made. Likewise, the words "inwardly" and "outwardly" are directions toward and away from, respectively, the geometric center of the referenced object. The terminology includes the words above specifically mentioned, derivatives thereof, and words of similar import.

In one embodiment of the present invention, a system and method are employed to estimate the location of a transmitter through an iterative application of received signal strength data (such as RSSI data), slow fading characteristics and geometric triangulation. In particular, and referring now to the drawings in detail, wherein like numerals are used to indicate like elements throughout, there is shown in FIG. 1 a data collection system 10 in accordance with one embodiment of the present invention. As seen, the system 10 includes a The essential elements of the equipment are a tunable receiver 12 with an appropriate antenna 12a for receiving RF transmissions (or the like) from one or more transmitters, a GPS (Global Positioning System) positioning device 14 with an appropriate antenna 14a for determining the global position of the system 10 at the time of each collection of data, and a recording device such as a computer 16 for recording the collected data from the receiver 12 and the corresponding positioning information from the GPS device 14. Thus, the system 10 is employed to produce a data file containing a plurality of entries, where each entry includes a Received Signal Level (RSL) (perhaps expressed in dBm) as obtained from the receiver 12, channel number as obtained from the receiver 12, and corresponding GPS coordinates as obtained from the GPS device 14, where all the data in the entries is collected from/in connection with an operating transmitter network with unknown transmitter locations.

Each of the aforementioned elements 12, 14, 16 of the system 10 may be any appropriate element without departing from the spirit and scope of the present invention, and may be appropriately configured in any particular arrangement, again without departing from the spirit and scope of the present invention. Moreover, the computer/recording device 16 may be running any appropriate software once again without departing from the spirit and scope of the present invention. The details and specifics of such elements, configuration, and software are known or should be apparent to the relevant public, and therefore need not be described further herein.

OVERVIEW

With the system 10 as shown in FIG. 1, the following method is employed in one embodiment of the present invention to estimate transmitter location. Briefly, in the method, the slow fading characteristics of the propagation environment are characterized by {P1, m} where P1 represents the one mile intercept, expressed in dBm, and m is the decay slope, expressed in dB per decade. Under these conditions, the RSL from each entry of the aforementioned data file and the distance from the associated transmitter are directly related. Applying triangulation and this relationship, an estimate of the transmitter location may be obtained.

The slow fading characteristics of an RF signal in the land mobile environment may be expressed as $L_P \approx 1/r^n$, where $L_P$ represents the RF path loss, r represents the distance, and n is the slow fading decay constant for a specific morphology group. Expressed in the logarithmic domain, $1/r^n$ becomes $-10\, n\log(r)$. The decay slope, m, is equal to $-10\, n$. The concept of the 1-mile intercept, P1, allows for convenient calculations in the logarithmic domain. An added benefit is the distance is great enough to ensure the main lobe of the antenna is considered thereby stabilizing the calculations.

The above concepts were applied with great success by W. C. Y. Lee in the equation:

$$RSL = P1 + 10\log\left(\frac{P_t}{P_{ref}}\right) + m\log(r) + \alpha\log\left(\frac{h_t}{h_{ref}}\right) + \beta\log\left(\frac{h_m}{h_{ref}}\right) + APE + KED$$

where:
RSL=Received Signal Level (dBm)
P1=1 mile intercept (dBm)
$P_t$=Effective Radiated Power (ERP) of the site
$P_{ref}$=Reference ERP
m=slow fading decay slope (dB/decade)
r=distance
α=coefficient applied to transmitter height adjustment
$h_t$=height above ground level of the base station transmit antenna
$h_{ref}$=reference height of the base station transmit antenna
β=coefficient applied to receiver height adjustment
$h_m$=height above ground level of the receiver (mobile) antenna
$h_{ref}$=reference height of the receiver antenna
APE=antenna pattern effects (vertical and horizontal beamwidths)
KED=Knife Edge Diffraction The primary contributors are RSL, P1, $10\log(P_t/P_{ref})$, mlog(r), and $\alpha\log(h_t/h_{ref})$. The remaining terms are either unknown or have little impact on the result. RSL is obtained from the collected data. P1, $P_t$, m, α, and $h_t$ are assumed. The distance r is to be calculated. The final equation to be used becomes:

$$r = 10 \wedge \left[\frac{1}{m}\left(RSL - P1 - 10\log\left(\frac{P_t}{P_{ref}}\right) - \alpha\log\left(\frac{h_t}{h_{ref}}\right)\right)\right]$$

Figure 2:
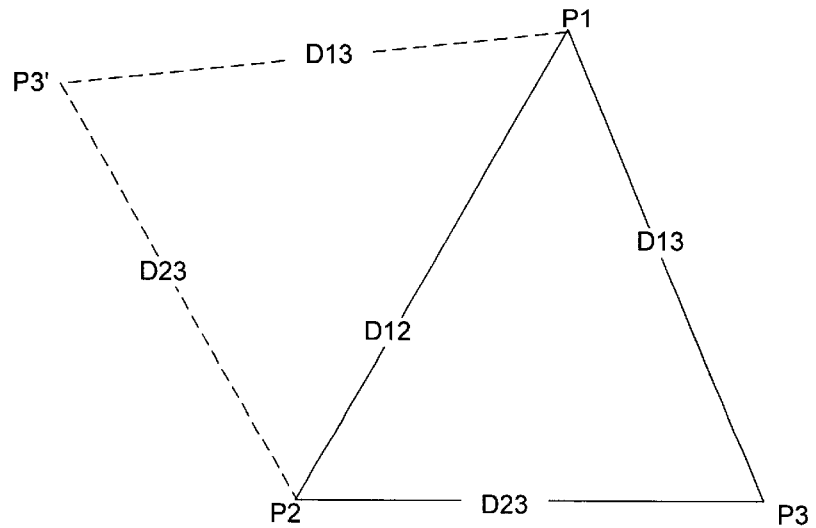
FIG. 2 is a diagram showing data points (P1, P2) at which data was collected and possible transmitter locations (P3, P3') represented by the data.

Referring now to FIG. 2, it is seen that P1 and P2 represent the location of two measured data points given by:

P1: Lat1, Lon1, RSL1, Chan1

P2: Lat2, Lon2, RSL2, Chan1 as derived from the aforementioned data file. Note here that Chan1 was measured at P1 and P2. P3 represents the estimated location of the transmitter from which Chan1 originated. P3' represents the mirror solution. D12 is the distance between the two data points and may be calculated with a reasonable degree of accuracy. D13 and D23 are the respective distances from the data point to the transmitter location and may be estimated by applying an assumed set of propagation parameters, including the slow fading characteristics of the environment. However, since D13 and D23 are estimated, the direct use of D12, D13, and D23 may not form a triangle that can be easily solved using the Law of Cosines.

Figure 3:
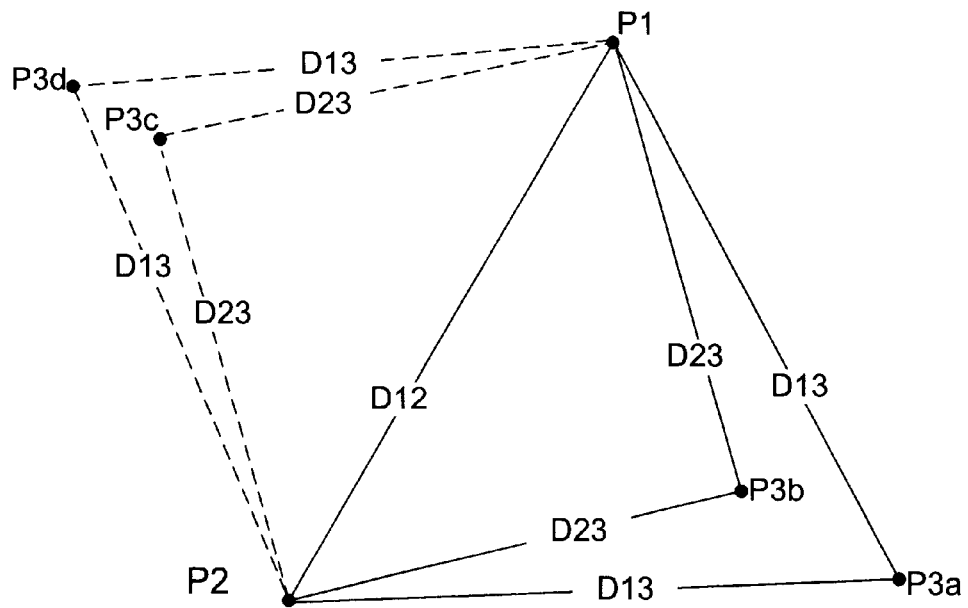
FIG. 3 is a diagram employed to show how an iterative approach are used to solve for four isosceles triangles using distances derived from FIG. 2 in accordance with one embodiment of the present invention.

In one embodiment of the present invention, then, and as shown in FIG. 3, an iterative approach of solving for four isosceles triangles using the three distances is implemented, thereby yielding 4 possible solutions (P3a, P3b, P3c, P3d). The coordinates of such isosceles triangles may be readily solved using the Law of Cosines. Performing the above procedure on N data points will yield 2N possible solutions. Such solutions are then divided into two groups, G1 and G2, where G1: {P3a, P3b} and G2: {P3c, P3d}. The arithmetic mean of each group is then calculated, and the average with the smallest variance is chosen to yield the estimated most likely location of the transmitter.

IMPLEMENTATION

In a transmitter network of a system such as a wireless communication systems, multiple channels are typically used multiple times (Frequency Reuse). In many cases, multiple directional antennas, each with its own channel, are assigned to an individual location (Sectorization). Also, the sampling rate of the scanning receiver is often greater than the rate of update of the GPS receiver, thereby producing multiple measurements at the same recorded location (Duplicate Coordinates). Therefore, the present invention must account for each of these real world conditions.

Duplicate Coordinates may be handled by either discarding subsequent entries or averaging them. Discarding subsequent entries is computationally more efficient than averaging but imposes significant risk of increased error due to limiting the information about the environment to a single data point. Averaging provides a mechanism to which more information about the environment is used, thereby decreasing the overall error imposed in the process. The computational cost of averaging is considerable small compared to the increased confidence associated with using all of the information. Therefore, averaging the RSL for duplicate coordinates is implemented in the present invention.

Frequency reuse is the retransmission of a given frequency, typically designated by a channel number, at multiple locations in a manner that introduces tolerable levels of interference into the communication path. In high capacity systems, reuse distances may be as small as two to three miles. An evaluation of the relative distances between successive coordinates of the same channel may be used to detect reuse. The limitation of this approach is that there is a risk of assigning a reuse characteristic to channels transmitted from a location with a discontinuous cover region. However, the solution for discontinuous coverage regions should converge to a relatively small area and may be treated as a sectored site.

Sectorization is a generic term that implies a location has multiple antennas transmitting unique frequencies. The solutions obtained for multiple channels from a single location should converge in a relatively small region. All solutions within a user-defined region will be attributed to a single location and assigned to the arithmetic average of all solutions within the region. This approach assumes the individual solutions are reasonably correct and will account for sites with discontinuous coverage areas.

ALGORITHM AND EXAMPLE

Figure 5:
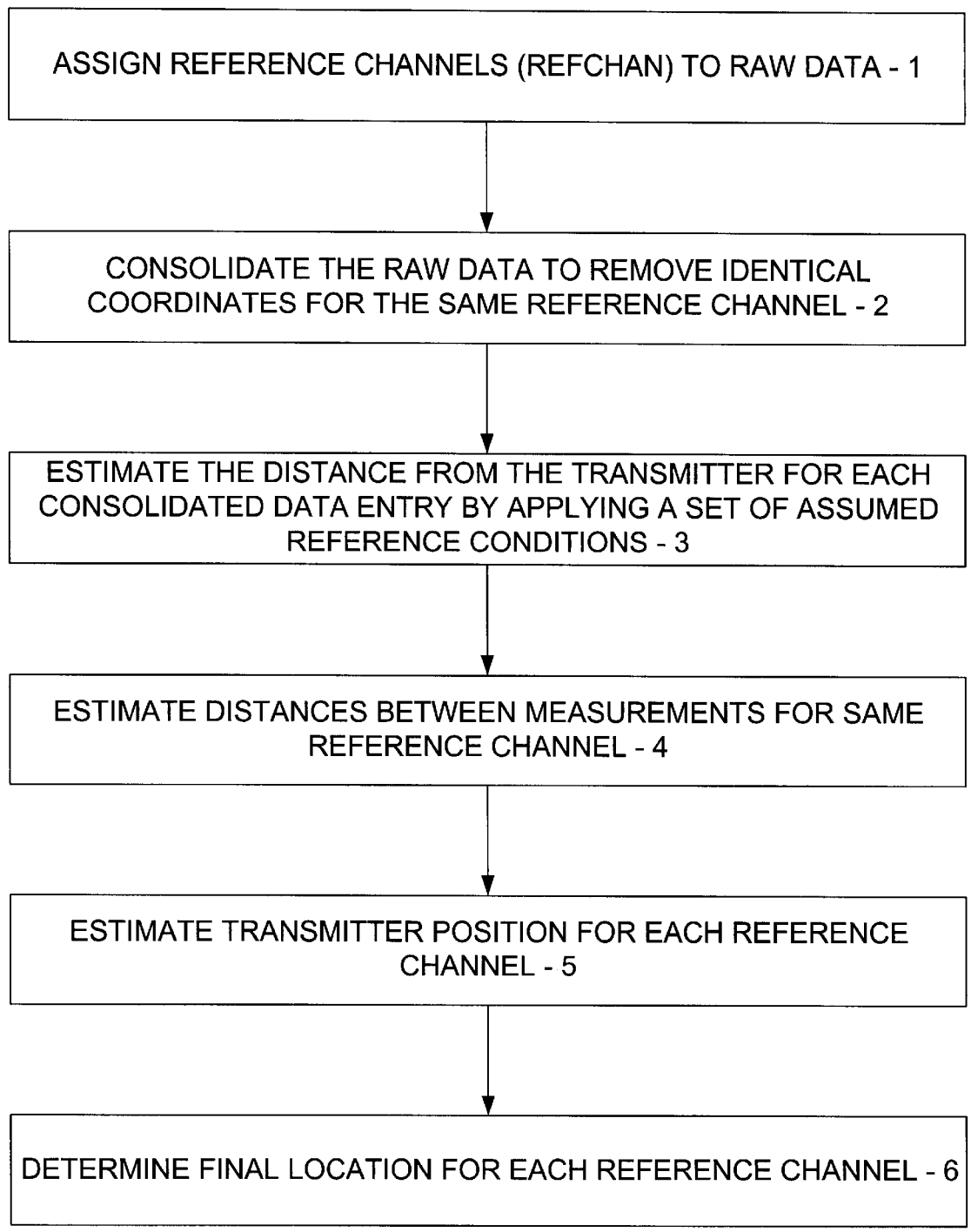
FIG. 5 is a flow diagram detailing an algorithm performed in accordance with one embodiment of the present invention.

In one embodiment of the present invention, an algorithm such as that detailed in connection with the example set forth below is employed to perform transmitter location estimation for one or more transmitters. Of course, many variations may be made to the algorithm listed below without departing from the spirit and scope of the present invention. Note that each step of the algorithm is also shown in FIG. 5.

Consider Table 1, as follows, which is derived from a sample data file containing the Latitude, Longitude, Channel, and RSL information therein:

TABLE 1

| Meas. | Latitude | Longitude | Channel | RSL | Ref. Chan. |
|---|---|---|---|---|---|
| 1 | 45.51988 | −122.563 | 857 | −53 | 1 |
| 2 | 45.51988 | −122.563 | 857 | −52 | 1 |
| 3 | 45.51988 | −122.563 | 857 | −52 | 1 |
| 4 | 45.51988 | −122.563 | 857 | −52 | 1 |
| 5 | 45.51988 | −122.563 | 101 | −48 | 2 |
| 6 | 45.51988 | −122.563 | 101 | −48 | 2 |
| 7 | 45.51988 | −122.563 | 101 | −48 | 2 |
| 8 | 45.51988 | −122.563 | 101 | −52 | 2 |
| 9 | 45.51966 | −122.563 | 101 | −44 | 2 |
| 10 | 45.51943 | −122.563 | 101 | −47 | 2 |
| 11 | 45.51919 | −122.563 | 101 | −50 | 2 |
| 12 | 45.5191 | −122.563 | 101 | −49 | 2 |
| 13 | 45.51913 | −122.563 | 857 | −48 | 3 |
| 14 | 45.51994 | −122.564 | 857 | −49 | 3 |
| 15 | 45.52127 | −122.564 | 857 | −52 | 3 |
| 16 | 45.52284 | −122.564 | 857 | −51 | 3 |
| 17 | 45.5246 | −122.564 | 857 | −44 | 3 |
| 18 | 45.52569 | −122.564 | 857 | −41 | 3 |

TABLE 1-continued

| Meas. | Latitude | Longitude | Channel | RSL | Ref. Chan. |
|---|---|---|---|---|---|
| 19 | 45.52595 | −122.564 | 857 | −39 | 3 |
| 20 | 45.52595 | −122.564 | 857 | −41 | 3 |
| 21 | 45.52595 | −122.564 | 857 | −41 | 3 |
| 22 | 45.52595 | −122.564 | 857 | −41 | 3 |
| 23 | 45.52618 | −122.564 | 857 | −36 | 3 |
| 24 | 45.52689 | −122.564 | 857 | −41 | 3 |
| 25 | 45.52827 | −122.564 | 857 | −40 | 3 |
| 26 | 45.5296 | −122.564 | 857 | −45 | 3 |
| 27 | 45.53179 | −122.564 | 857 | −52 | 3 |
| 28 | 45.53352 | −122.564 | 857 | −59 | 3 |
| 29 | 45.53509 | −122.563 | 857 | −62 | 3 |
| 30 | 45.53653 | −122.562 | 857 | −70 | 3 |
| 31 | 45.53837 | −122.562 | 857 | −68 | 3 |
| 32 | 45.53998 | −122.561 | 857 | −64 | 3 |
| 33 | 45.54144 | −122.561 | 857 | −63 | 3 |
| 34 | 45.54307 | −122.561 | 857 | −62 | 3 |
| 35 | 45.54483 | −122.56 | 857 | −70 | 3 |
| 36 | 45.54627 | −122.559 | 857 | −73 | 3 |

1. Assign Reference Channels (RefChan) to raw data:

As seen in Table 1, Measurements 1 through 4 are all from channel 857 and are assigned Reference Channel 1; Measurements 5 through 12 are all from channel 101 and are assigned Reference Channel 2; and Measurements 13 through 36 are all from channel 857 and are assigned Reference Channel 3.

2. Consolidate the Raw Data to remove identical coordinates for the same Reference Channel:

For each group of data entries having a common assigned Reference Channel, the average RSL is calculated as:

$$\bar{x} = \frac{1}{N}\sum_{i=1}^{N} x_i,$$

where $\bar{x}$ is the average RSL, N is the number of measurements with identical Reference Channel and GPS Coordinates, $x_i$ is the individual measurement. The standard deviation, sigma ($\sigma$), is given by:

$$\sigma = \frac{1}{N-1}\sum_{i=1}^{N}(x_i^2 - x^{-2}).$$

If there is only one sample, the standard deviation is theoretically infinity but is determined to be 0 for practical purposes. The standard deviation as calculated here is not further employed in the algorithm of the present invention, but does aid in determining the reliability or 'spread' of the RSL data. The consolidated raw data with the average RSL and standard deviation appears in Table 2, below.

3. Estimate the distance from the transmitter for each consolidated data entry by applying a set of assumed reference conditions:

The following reference conditions are employed in connection with the present example, and are typical of an 850 MHz system operating in a suburban environment. Of course, other reference conditions may be employed without departing from the spirit and scope of the present invention.

$P_t$=100 Watts $P_{ref}$=100 Watts

P1=−59 dBm m=38.4 dB/decade $h_t$=130'

$h_{ref}=150'$ $\alpha=15$

Applying the above conditions to the consolidated data file using the equation set forth above for r yields the results given in Table 2, as follows:

TABLE 2

| RefChan | # Meas. | Latitude | Longitude | Ave. RSL (dBm) | sigma | r (miles) |
|---|---|---|---|---|---|---|
| 1 | 4 | 45.5199 | −122.563 | −52.25 | 0.5 | 0.63087 |
| 2 | 4 | 45.5199 | −122.563 | −49 | 2 | 0.51917 |
| 2 | 1 | 45.5197 | −122.563 | −44 | 0 | 0.38468 |
| 2 | 1 | 45.5194 | −122.563 | −47 | 0 | 0.46049 |
| 2 | 1 | 45.5192 | −122.563 | −50 | 0 | 0.55125 |
| 2 | 1 | 45.5191 | −122.563 | −49 | 0 | 0.51917 |
| 3 | 1 | 45.5191 | −122.563 | −48 | 0 | 0.48895 |
| 3 | 1 | 45.5199 | −122.564 | −49 | 0 | 0.51917 |
| 3 | 1 | 45.5213 | −122.564 | −52 | 0 | 0.62149 |
| 3 | 1 | 45.5228 | −122.564 | −51 | 0 | 0.58532 |
| 3 | 1 | 45.5246 | −122.564 | −44 | 0 | 0.38468 |
| 3 | 1 | 45.5257 | −122.564 | −41 | 0 | 0.32135 |
| 3 | 4 | 45.526 | −122.564 | −40.5 | 1 | 0.31185 |
| 3 | 1 | 45.5262 | −122.564 | −36 | 0 | 0.2381 |
| 3 | 1 | 45.5269 | −122.564 | −41 | 0 | 0.32135 |
| 3 | 1 | 45.5283 | −122.564 | −40 | 0 | 0.30264 |
| 3 | 1 | 45.5296 | −122.564 | −45 | 0 | 0.40845 |
| 3 | 1 | 45.5318 | −122.564 | −52 | 0 | 0.62149 |
| 3 | 1 | 45.5335 | −122.564 | −59 | 0 | 0.94563 |
| 3 | 1 | 45.5351 | −122.563 | −62 | 0 | 1.13201 |
| 3 | 1 | 45.5365 | −122.562 | −70 | 0 | 1.82887 |
| 3 | 1 | 45.5384 | −122.562 | −68 | 0 | 1.62218 |
| 3 | 1 | 45.54 | −122.561 | −64 | 0 | 1.27624 |
| 3 | 1 | 45.5414 | −122.561 | −63 | 0 | 1.20196 |
| 3 | 1 | 45.5431 | −122.561 | −62 | 0 | 1.13201 |
| 3 | 1 | 45.5448 | −122.56 | −70 | 0 | 1.82887 |
| 3 | 1 | 45.5463 | −122.559 | −73 | 0 | 2.18931 |

4. Estimate distances between measurements for same Reference Channel:

The triangulation procedure requires at least two consolidated measurements with the same reference channel. Since Reference Channel 1 has only one consolidated measurement, no estimate can be made. However, estimates may be made for Reference Channels 2 and 3.

First, the distance between measurements of the same reference channel must be determined. The constants of interest are:

Polar circumference of the earth $(C_{Pol})=2*\pi*3949.9028$ miles=817.9712377 miles Equatorial circumference of the earth $(C_{Equ})= 2*\pi*3963.1906$ miles=901.4609475 miles Latitudinal Distance—consider two lines of latitude (La1, La2). Since the lines of latitude are equally spaced, the latitudinal distance may be easily calculated by:

$$D_{Lat} = \frac{C_{Pol}*|La1-La2|}{360}$$

Longitudinal Distance—consider two lines of longitude (Lo1, Lo2). Since the distance between lines of longitude are dependant on the corresponding latitudes, longitudinal distance is calculated by:

$$D_{Lon} = \frac{C_{Pol}*|Lo1-Lo2|}{360}\cos_{deg}\left(\frac{La1+La2}{2}\right)$$

Final Distance—the final distance is given by the hypotenuse of the right triangle formed by $D_{Lat}$ and $D_{Lon}$ and is calculated using the Pythagorean Theorem as follows.

$$D=(D_{Lat}^2+D_{Lon}^2)^{1/2}$$

Applying the above equations to the data in Table 2 yields the data in Table 3, below. Note that since each $D_{Lat}$ and $D_{Lon}$ calculation requires a pair of latitude—longitude position coordinates, the calculation for each data entry (row) employs the coordinates of that row and of the next row below. In the case of the last data entry (row) for a particular reference channel, no calculation is performed since no next row exists for such last row.

TABLE 3

| Ref. Ch. | # Ms. | Lat. | Long. | r (miles) | $D_{Lat}$ (miles) | $D_{Lon}$ (miles) | D (miles) |
|---|---|---|---|---|---|---|---|
| 1 | 4 | 45.5199 | −122.563 | 0.63087 | N/A | N/A | N/A |
| 2 | 4 | 45.5199 | −122.563 | 0.51917 | 0.013788 | 0 | 0.01379 |
| 2 | 1 | 45.5197 | −122.563 | 0.38468 | 0.020682 | 0 | 0.02068 |
| 2 | 1 | 45.5194 | −122.563 | 0.46049 | 0.013788 | 0 | 0.01379 |
| 2 | 1 | 45.5192 | −122.563 | 0.55125 | 0.006618 | 0.00974 | 0.01178 |
| 2 | 1 | 45.5191 | −122.563 | 0.51917 | N/A | N/A | N/A |
| 3 | 1 | 45.5191 | −122.563 | 0.48895 | 0.056323 | 0.01478 | 0.05823 |
| 3 | 1 | 45.5199 | −122.564 | 0.51917 | 0.091482 | 0.0033 | 0.09154 |
| 3 | 1 | 45.5213 | −122.564 | 0.62149 | 0.108096 | 0.00111 | 0.1081 |
| 3 | 1 | 45.5228 | −122.564 | 0.58532 | 0.121263 | 0.00111 | 0.12127 |
| 3 | 1 | 45.5246 | −122.564 | 0.38468 | 0.075419 | 0 | 0.07542 |
| 3 | 1 | 45.5257 | −122.564 | 0.32135 | 0.017924 | 0.00107 | 0.01796 |
| 3 | 4 | 45.526 | −122.564 | 0.31185 | 0.016063 | 0 | 0.01606 |
| 3 | 1 | 45.5262 | −122.564 | 0.2381 | 0.048878 | 0.00407 | 0.04905 |
| 3 | 1 | 45.5269 | −122.564 | 0.32135 | 0.094653 | 0.00184 | 0.09467 |
| 3 | 1 | 45.5283 | −122.564 | 0.30264 | 0.091826 | 0.00145 | 0.09184 |
| 3 | 1 | 45.5296 | −122.564 | 0.40845 | 0.150907 | 0.00296 | 0.15094 |
| 3 | 1 | 45.5318 | −122.564 | 0.62149 | 0.119678 | 0.00518 | 0.11979 |
| 3 | 1 | 45.5335 | −122.564 | 0.94563 | 0.108096 | 0.03033 | 0.11227 |
| 3 | 1 | 45.5351 | −122.563 | 1.13201 | 0.099134 | 0.02364 | 0.10191 |
| 3 | 1 | 45.5365 | −122.562 | 1.82887 | 0127054 | 0.02587 | 0.12966 |
| 3 | 1 | 45.5384 | −122.562 | 1.62218 | 0.110923 | 0.02219 | 0.11312 |
| 3 | 1 | 45.54 | −122.561 | 1.27624 | 0.10072 | 0.01846 | 0.1024 |
| 3 | 1 | 45.5414 | −122.561 | 1.20196 | 0.112301 | 0.02514 | 0.11508 |
| 3 | 1 | 45.5431 | −122.561 | 1.13201 | 0.121263 | 0.03401 | 0.12594 |

TABLE 3-continued

| Ref. Ch. | # Ms. | Lat. | Long. | r (miles) | $D_{Lat}$ (miles) | $D_{Lon}$ (miles) | D (miles) |
|---|---|---|---|---|---|---|---|
| 3 | 1 | 45.5448 | −122.56 | 1.82887 | 0.099134 | 0.02737 | 0.10284 |
| 3 | 1 | 45.5463 | −122.559 | 2.18931 | N/A | N/A | N/A |

Figure 4:
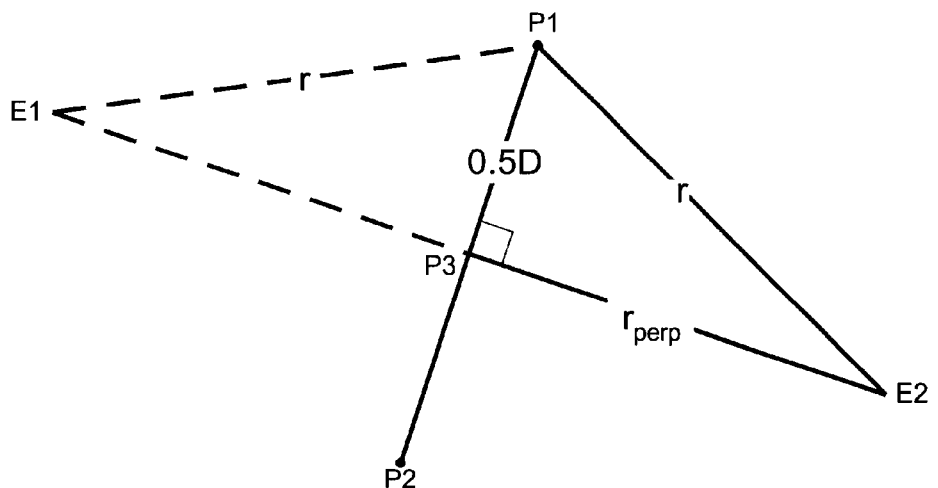
FIG. 4 is a diagram employed to show how transmitter locations are estimated from data points in accordance with one embodiment of the present invention.

5. Estimate Transmitter Position for each Reference Channel:

The position estimation is accomplished using D/2 and r from Table 3, above, to form a series of right triangles. Consider the diagram shown in FIG. 4, where P1, and P2 are measured data points given by (La1, Lo1) and (La2, Lo2) respectively (La is latitude, Lo is longitude). P3 is the midpoint between the P1 and P2 along the line D. E1 and E2 are estimated transmitter locations using the distance calculated from the RSL of P1. E1 and E2 lie along a line that is perpendicular to and bisects D at P3 and are given by (ELa1, ELo1) and (ELo2, ELo2) respectively. The distance from P3 to either E1 or E2 is given by $$r_{perp} = \sqrt{r^2 - \left(\frac{D}{2}\right)^2}$$

The slope of $r_{perp}$ is the negative reciprocal of the slope m of line D. Applying the above properties, the coordinates of E1 and E2 may be calculated as follows:

$$ELa1 = La3 + \frac{360 * r_{perp}}{m * C_{Pol}}$$

$$ELo1 = Lo3 - \frac{360 * m * (ELa1 - ELa3)}{C_{Equ}}$$

$$ELa2 = La3 - \frac{360 * r_{perp}}{m * C_{Pol}}$$

$$ELo2 = Lo3 + \frac{360 * m * (ELa2 - ELa3)}{C_{Equ}}$$

Applying the above equations to the data from Table 3 yields Table 4A and 4B (where the first three columns thereof are identical), as follows:

TABLE 4A

| Ref Chan | r (miles) | D (miles) | La3 | Lo3 | $r_{perp}$ | m |
|---|---|---|---|---|---|---|
| 1 | 0.63087 | N/A | N/A | N/A | N/A | N/A |
| 2 | 0.51917 | 0.01379 | 45.5198 | −122.563 | 0.51898 | 2000000 |
| 2 | 0.38468 | 0.02068 | 45.51955 | −122.563 | 0.38412 | 3000000 |
| 2 | 0.46049 | 0.01379 | 45.5193 | −122.563 | 0.46029 | 2000000 |
| 2 | 0.55125 | 0.01178 | 45.519152 | −122.56310 | 0.55112 | 0.47761 |
| 2 | 0.51917 | N/A | N/A | N/A | N/A | N/A |
| 3 | 0.48895 | 0.05823 | 45.5195345 | −122.56362 | 0.48547 | −2.67869 |
| 3 | 0.51917 | 0.09154 | 45.5206065 | −122.56374 | 0.51103 | 19.51471 |
| 3 | 0.62149 | 0.10810 | 45.522054 | −122.56370 | 0.61201 | 68.17391 |
| 3 | 0.58532 | 0.12127 | 45.5237175 | −122.56370 | 0.57262 | −76.47826 |
| 3 | 0.38468 | 0.07542 | 45.525144 | −122.56371 | 0.37721 | −10940000 |
| 3 | 0.32135 | 0.01796 | 45.525821 | −122.56372 | 0.32084 | −11.81818 |
| 3 | 0.31185 | 0.01606 | 45.5260675 | −122.56373 | 0.31144 | −2330000 |
| 3 | 0.23810 | 0.04905 | 45.5265385 | −122.56377 | 0.23300 | −8.44048 |
| 3 | 0.32135 | 0.09467 | 45.5275795 | −122.5638 | 0.30708 | 36.13158 |
| 3 | 0.30264 | 0.09184 | 45.528932 | −122.56376 | 0.28837 | 44.40000 |
| 3 | 0.40845 | 0.15094 | 45.5306925 | −122.56372 | 0.37954 | 35.88525 |
| 3 | 0.62149 | 0.11979 | 45.532655 | −122.56363 | 0.60983 | 16.22430 |
| 3 | 0.94563 | 0.11227 | 45.534307 | −122.56327 | 0.93895 | 2.50479 |
| 3 | 1.13201 | 0.10191 | 45.53581 | −122.56271 | 1.12741 | 2.94672 |
| 3 | 1.82887 | 0.12966 | 45.5374505 | −122.56220 | 1.82426 | 3.45131 |
| 3 | 1.62218 | 0.11312 | 45.5391765 | −122.56170 | 1.61823 | 3.51310 |
| 3 | 1.27624 | 0.10240 | 45.5407115 | −122.56128 | 1.27212 | 3.83465 |
| 3 | 1.20196 | 0.11508 | 45.5422565 | −122.56083 | 1.19644 | 3.13873 |
| 3 | 1.13201 | 0.12594 | 45.5439505 | −122.56022 | 1.12498 | 2.50570 |
| 3 | 1.82887 | 0.10284 | 45.545549 | −122.55959 | 1.82597 | 2.54513 |
| 3 | 2.18931 | N/A | N/A | N/A | N/A | N/A |

TABLE 4B

| Ref Chan | r (miles) | D (miles) | Ela1 | ELo1 | ELa2 | Elo2 |
|---|---|---|---|---|---|---|
| 1 | 0.63087 | N/A | N/A | N/A | N/A | N/A |
| 2 | 0.51917 | 0.01379 | 45.5198 | −122.5631088 | 45.5198 | −122.5628912 |
| 2 | 0.38468 | 0.02068 | 45.51955 | −122.5630806 | 45.51955 | −122.5629194 |
| 2 | 0.46049 | 0.01379 | 45.5193 | −122.5630965 | 45.5193 | −122.5629035 |
| 2 | 0.55125 | 0.01178 | 45.53589026 | −122.5632161 | 45.50241374 | −122.5629849 |
| 2 | 0.51917 | N/A | N/A | N/A | N/A | N/A |

TABLE 4B-continued

| Ref Chan | r (miles) | D (miles) | Ela1 | ELo1 | ELa2 | Elo2 |
|---|---|---|---|---|---|---|
| 3 | 0.48895 | 0.05823 | 45.51690558 | −122.5637303 | 45.52216342 | −122.5635267 |
| 3 | 0.51917 | 0.09154 | 45.52098636 | −122.5638542 | 45.52022664 | −122.5636398 |
| 3 | 0.62149 | 0.10810 | 45.52218422 | −122.5638298 | 45.52192378 | −122.5635732 |
| 3 | 0.58532 | 0.12127 | 45.52360889 | −122.5638216 | 45.52382611 | −122.5635814 |
| 3 | 0.38468 | 0.07542 | 45.525144 | −122.5637921 | 45.525144 | −122.5636339 |
| 3 | 0.32135 | 0.01796 | 45.5254272 | −122.5637913 | 45.5262148 | −122.5636567 |
| 3 | 0.31185 | 0.01606 | 45.5260675 | −122.5638003 | 45.5260675 | −122.5636697 |
| 3 | 0.23810 | 0.04905 | 45.52613808 | −122.5638259 | 45.52693892 | −122.5637281 |
| 3 | 0.32135 | 0.09467 | 45.52770278 | −122.5638644 | 45.52745622 | −122.5637356 |
| 3 | 0.30264 | 0.09184 | 45.52902621 | −122.5638265 | 45.52883779 | −122.5637055 |
| 3 | 0.40845 | 0.15094 | 45.53084592 | −122.5638001 | 45.53053908 | −122.5636409 |
| 3 | 0.62149 | 0.11979 | 45.53320023 | −122.5637644 | 45.53210977 | −122.5635086 |
| 3 | 0.94563 | 0.11227 | 45.53974458 | −122.5634669 | 45.52886942 | −122.5630731 |
| 3 | 1.13201 | 0.10191 | 45.54135981 | −122.5629494 | 45.53026019 | −122.5624766 |
| 3 | 1.82887 | 0.12966 | 45.54511775 | −122.5625846 | 45.52978325 | −122.5618194 |
| 3 | 1.62218 | 0.11312 | 45.54585818 | −122.5620454 | 45.53249482 | −122.5613666 |
| 3 | 1.27624 | 0.10240 | 45.54552366 | −122.5615533 | 45.53589934 | −122.5610197 |
| 3 | 1.20196 | 0.11508 | 45.54778583 | −122.5610874 | 45.53672717 | −122.5605856 |
| 3 | 1.13201 | 0.12594 | 45.55046305 | −122.5604619 | 45.53743795 | −122.5599901 |
| 3 | 1.82887 | 0.10284 | 45.55595586 | −122.5599754 | 45.53514214 | −122.5592096 |
| 3 | 2.18931 | N/A | N/A | N/A | N/A | N/A |

6. Determine final location for each Reference Channel:

The final location for each reference channel is determined by averaging the results of E1 and E2 for each reference channel and assessing the spread of results for each E1 and E2. Such assessment is accomplished by treating the standard deviation of the latitude and longitude calculations as independent and calculating the composite standard deviation $\sigma$ as a root mean square, as follows:

$$\sigma = \sqrt{\sigma_{La}^2 + \sigma_{Lo}^2}$$

The composite standard deviations a for the solutions of reference channels 2 and 3 are:

TABLE 5

| Ref. Ch. | ELa1 Ave. | ELo1 Ave. | sigma 1 | Ela2 Ave. | ELo2 Ave. | sigma 2 |
|---|---|---|---|---|---|---|
| 2 | 45.523635 | −122.56313 | 0.0081729 | 45.515266 | −122.56292 | 0.0085707 |
| 3 | 45.533952 | −122.56299 | 0.0115133 | 45.528903 | −122.56266 | 0.0020679 |

The above results are then examined to determine from the sigmas 1 and 2 for each reference channel which of E1 and E2 is the more likely true location of the transmitter corresponding to such reference channel. That is, a smaller sigma indicates a smaller spread of the associated data and therefore a higher reliability in the results of such data. In particular, the results indicate that the location of the reference channel 2 transmitter is most likely E1, which has a sigma 1 less than the sigma 2 of E2, and E1 has the coordinates shown. The most likely location estimate for the reference channel 3 transmitter is E2 with a sigma 2 much less than the sigma 1 of E1.

It is to be noted that the method of the present invention may be performed manually, although with considerable effort and time required to do so. Of course, such method may also be performed in an automated and faster manner by way of a computer or processor 18 or the like, as is shown in FIG. 1. Such computer or processor 18 may be any appropriate computer or processor without departing from the spirit and scope of the present invention. In fact, the computer 18 may be the recording device/computer 16, which is to say that the method of the present invention may be performed on the computer 16, thus obviating the need for an additional computer to be computer 18. Moreover, the software employed to perform the method on the computer 18 may be any appropriate software, again without departing from the spirit and scope of the present invention. The details of such software are known or should be apparent to the relevant public, and therefore need not be described herein in further detail.

In the foregoing description, it can be seen that the present invention comprises a new and useful method for estimating the position of one or more transmitter locations based on signals transmitted from such transmitter(s). It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A method for estimating the location of a transmitter based on signals transmitted therefrom, the transmitted signals being received at a plurality of reception locations and being employed to compile data including a plurality of entries, each entry including a received signal level (RSL) of a received signal, a channel identification of the received signal, and position information corresponding to the respective reception location when the received signal was received, the method comprising:

organizing the entries into groups according to channel identification;

in each group, consolidating entries having the same position information;

for each entry, estimating the distance DRT between the reception location and the transmitter;

for each entry, estimating the distance DRR between the reception location thereof and an adjacent reception location; and for each group, estimating the location of the transmitter corresponding to the channel identification of such group based on the distances DRT and DRR.

2. The method of claim 1 wherein estimating the location of the transmitter corresponding to the channel identification of such group based on the distances DRT and DRR for each group comprises:

for each entry:
employing the distances DRR and DRT thereof to form mirrored isosceles triangles, each having a common base with distance DRR and sides with distances DRT; and estimating first and second isosceles location for the transmitter based on the formed mirrored isosceles triangles; and for each group:
averaging the first isosceles locations thereof;
assessing the deviation of the first isosceles locations thereof;
averaging the second isosceles locations thereof;
assessing the deviation of the second isosceles locations thereof; and
determining from the deviations which of the first and second averaged locations is the location of the transmitter of such group.

3. The method of claim 1 wherein estimating the first and second isosceles locations for each group comprises estimating such locations such that the first isosceles locations are on one side of a path defined by the common bases and wherein the second isosceles locations are on the other side of such path.

4. The method of claim 1 wherein each of the first and second isosceles locations is expressed according to first and second coordinates, and wherein averaging comprises averaging the respective first coordinates to produce an averaged first coordinate and averaging the respective second coordinates to produce an averaged second coordinate.

5. The method of claim 4 wherein assessing the deviation comprises determining a first deviation of the respective first coordinates, determining a second deviation of the respective second coordinates, and determining a root mean square of the first and second deviations.

6. The method of claim 1 wherein consolidating entries comprises replacing each set of entries having the same position information with a consolidated entry having such position information and an average of the received signal levels in the set.

7. The method of claim 1 wherein estimating the distance DRT for each entry comprises estimating such distance by applying the received signal level for the entry and a set of assumed reference conditions to a distance estimating function.

8. The method of claim 7 wherein applying the set of assumed reference conditions comprises selecting the assumed reference conditions based on the type of transmitter and environment.

9. The method of claim 7 comprising applying the received signal level and the assumed reference conditions to the function:

$$r = 10\wedge\left[\frac{1}{m}\left(RSL - P1 - 10\log\left(\frac{P_t}{P_{ref}}\right) - \alpha\log\left(\frac{h_t}{h_{ref}}\right)\right)\right]$$

where:
RSL=Received Signal Level (dBm)
P1=1 mile intercept (dBm)
$P_t$=Effective Radiated Power (ERP) of the site
$P_{ref}$=Reference ERP
m=slow fading decay slope (dB/decade)
r=the estimated distance
$\alpha$=coefficient applied to transmitter height adjustment
$h_t$=height above ground level of the base station transmit antenna; and
$h_{ref}$=reference height of the base station transmit antenna.

10. The method of claim 1 comprising estimating for each entry the distance between the reception location thereof and one of the reception location previous thereto and the reception location next thereafter.

11. A computer-readable medium having computer-executable instructions thereon for estimating the location of a transmitter based on signals transmitted therefrom, the transmitted signals being received at a plurality of reception locations and being employed to compile data including a plurality of entries, each entry including a received signal level (RSL) of a received signal, a channel identification of the received signal, and position information corresponding to the respective reception location when the received signal was received, the instructions comprising modules including:

a first module for organizing the entries into groups according to channel identification;
a second module for, in each group, consolidating entries having the same position information;
a third module for, for each entry, estimating the distance DRT between the reception location and the transmitter;
a fourth module for, for each entry, estimating the distance DRR between the reception location thereof and an adjacent reception location; and
a fifth module for, for each group, estimating the location of the transmitter corresponding to the channel identification of such group based on the distances DRT and DRR.

12. The medium of claim 11 wherein the fifth module comprises:

for each entry:
a first sub-module for employing the distances DRR and DRT thereof to form mirrored isosceles triangles, each having a common base with distance DRR and sides with distances DRT; and
a second sub-module for estimating first and second isosceles location for the transmitter based on the formed mirrored isosceles triangles; and for each group:
a third sub-module for averaging the first isosceles locations thereof;
a fourth sub-module for assessing the deviation of the first isosceles locations thereof;
a fifth sub-module for averaging the second isosceles locations thereof;
a sixth sub-module for assessing the deviation of the second isosceles locations thereof; and
a seventh sub-module for determining from the deviations which of the first and second averaged locations is the location of the transmitter of such group.

13. The medium of claim 11 wherein the second sub-module estimates the first and second isosceles locations for each group such that the first isosceles locations are on one side of a path defined by the common bases and wherein the second isosceles locations are on the other side of such path.

14. The medium of claim 11 wherein each of the first and second isosceles locations is expressed according to first and second coordinates, and wherein the third and fifth sub-modules average the respective first coordinates to produce an averaged first coordinate and average the respective second coordinates to produce an averaged second coordinate.

15. The medium of claim 14 wherein the fourth and sixth sub-modules assess the deviation by determining a first deviation of the respective first coordinates, determining a second deviation of the respective second coordinates, and determining a root mean square of the first and second deviations.

16. The medium of claim 11 wherein the second module consolidates entries by replacing each set of entries having the same position information with a consolidated entry having such position information and an average of the received signal levels in the set.

17. The medium of claim 11 wherein the third module estimates the distance DRT for each entry by applying the received signal level for the entry and a set of assumed reference conditions to a distance estimating function.

18. The medium of claim 17 wherein the third module selects the assumed reference conditions based on the type of transmitter and environment.

19. The medium of claim 17 wherein the third module applies the received signal level and the assumed reference conditions to the function:

$$r = 10 \wedge \left[\frac{1}{m}\left(RSL - P1 - 10\log\left(\frac{P_t}{P_{ref}}\right) - \alpha\log\left(\frac{h_t}{h_{ref}}\right)\right)\right]$$

where:
RSL=Received Signal Level (dBm)
P1=1 mile intercept (dBm)
$P_t$=Effective Radiated Power (ERP) of the site
$P_{ref}$=Reference ERP
m=slow fading decay slope (dB/decade)
r=the estimated distance
α=coefficient applied to transmitter height adjustment
$h_t$=height above ground level of the base station transmit antenna; and
$h_{ref}$=reference height of the base station transmit antenna.

20. The medium of claim 11 wherein the fourth module estimates the distance DRR between the reception location thereof and one of the reception location previous thereto and the reception location next thereafter.

21. A computer executing computer-executable instructions thereon for estimating the location of a transmitter based on signals transmitted therefrom, the transmitted signals being received at a plurality of reception locations and being employed to compile data including a plurality of entries, each entry including a received signal level (RSL) of a received signal, a channel identification of the received signal, and position information corresponding to the respective reception location when the received signal was received, the instructions comprising modules including:

a first module organizing the entries into groups according to channel identification;

a second module consolidating, in each group, entries having the same position information;

a third module, for each entry, estimating the distance DRT between the reception location and the transmitter;

a fourth module, for each entry, estimating the distance DRR between the reception location thereof and an adjacent reception location; and a fifth module, for each group, estimating the location of the transmitter corresponding to the channel identification of such group based on the distances DRT and DRR.

22. The computer of claim 21 wherein the fifth module comprises:

for each entry:
a first sub-module employing the distances DRR and DRT thereof to form mirrored isosceles triangles, each having a common base with distance DRR and sides with distances DRT; and
a second sub-module estimating first and second isosceles location for the transmitter based on the formed mirrored isosceles triangles; and for each group:
a third sub-module averaging the first isosceles locations thereof;
a fourth sub-module assessing the deviation of the first isosceles locations thereof;
a fifth sub-module averaging the second isosceles locations thereof;
a sixth sub-module assessing the deviation of the second isosceles locations thereof; and
a seventh sub-module determining from the deviations which of the first and second averaged locations is the location of the transmitter of such group.

23. The computer of claim 21 wherein the second sub-module estimates the first and second isosceles locations for each group such that the first isosceles locations are on one side of a path defined by the common bases and wherein the second isosceles locations are on the other side of such path.

24. The computer of claim 21 wherein each of the first and second isosceles locations is expressed according to first and second coordinates, and wherein the third and fifth sub-modules average the respective first coordinates to produce an averaged first coordinate and average the respective second coordinates to produce an averaged second coordinate.

25. The computer of claim 24 wherein the fourth and sixth sub-modules assess the deviation by determining a first deviation of the respective first coordinates, determining a second deviation of the respective second coordinates, and determining a root mean square of the first and second deviations.

26. The computer of claim 21 wherein the second module consolidates entries by replacing each set of entries having the same position information with a consolidated entry having such position information and an average of the received signal levels in the set.

27. The computer of claim 21 wherein the third module estimates the distance DRT for each entry by applying the received signal level for the entry and a set of assumed reference conditions to a distance estimating function.

28. The computer of claim 27 wherein the third module selects the assumed reference conditions based on the type of transmitter and environment.

29. The computer of claim 27 wherein the third module applies the received signal level and the assumed reference conditions to the function:

$$r = 10^{\wedge}\left[\frac{1}{m}\left(RSL - P1 - 10\log\left(\frac{P_t}{P_{ref}}\right) - \alpha\log\left(\frac{h_t}{h_{ref}}\right)\right)\right]$$

where:

RSL=Received Signal Level (dBm)

P1=1 mile intercept (dBm)

$P_t$=Effective Radiated Power (ERP) of the site $P_{ref}$=Reference ERP m=slow fading decay slope (dB/decade)

r=the estimated distance

α=coefficient applied to transmitter height adjustment $h_t$=height above ground level of the base station transmit antenna; and $h_{ref}$=reference height of the base station transmit antenna.

30. The computer of claim 21 wherein the fourth module estimates the distance DRR between the reception location thereof and one of the reception location previous thereto and the reception location next thereafter.

* * * * *